Dec. 29, 1931.       M. E. WIDELL       1,838,343
AIR PRESSURE REDUCER VALVE
Filed Oct. 25, 1928      2 Sheets-Sheet 1
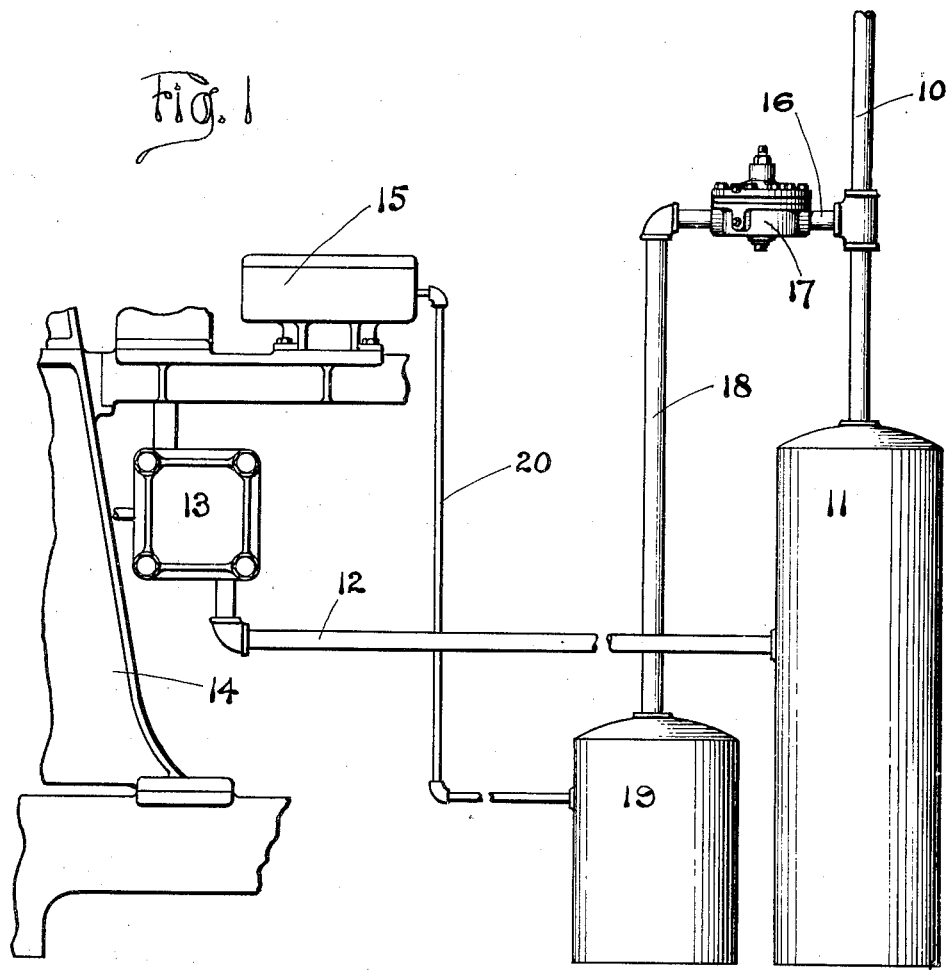
Magnus E. Widell
INVENTOR
BY John C. Carpenter
ATTORNEY

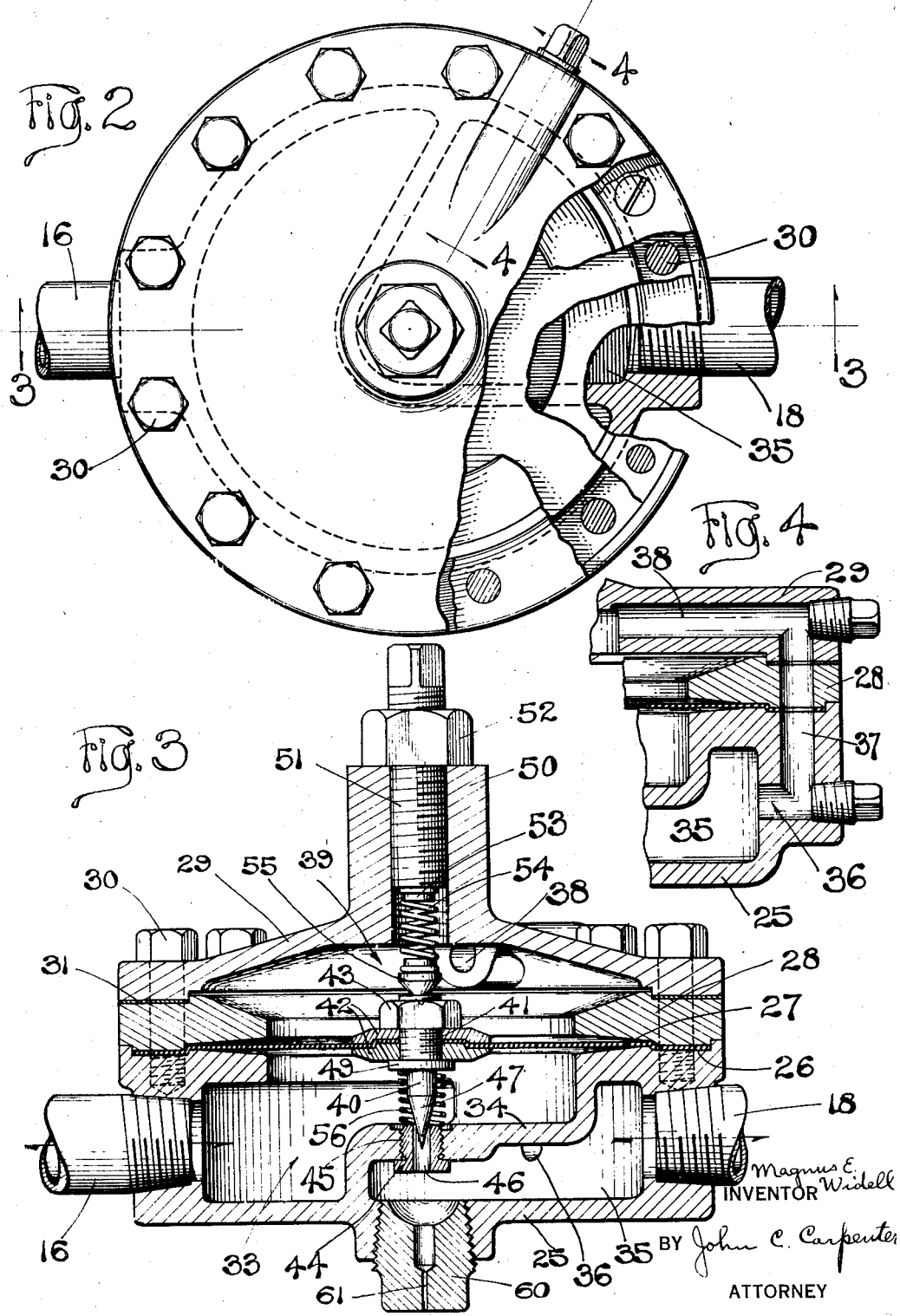

Patented Dec. 29, 1931

1,838,343

UNITED STATES PATENT OFFICE

MAGNUS E. WIDELL, OF CINCINNATI, OHIO, ASSIGNOR TO AMERICAN CAN COMPANY, OF NEW YORK, N. Y., A CORPORATION OF NEW JERSEY

AIR PRESSURE REDUCER VALVE

Application filed October 25, 1928. Serial No. 314,903.

This invention relates to an air pressure reducer valve for use in an air line where the air is received from a source of air supplied at one pressure and delivered at a different pressure.

The invention is particularly directed to an air pressure reducer valve which will deliver air at a pressure which will differ in an exact, predetermined amount from the pressure of the air received in the valve and which will therefore deliver air at different pressures as the pressures of the air received differ.

In all air pressure reducer valves, as far as I am aware, the air is delivered at constant pressure regardless of variations in pressures of air received within the valve. In some classes of machinery, it is very important that an exact difference of air pressure be maintained between certain parts of the machine, and this difference regardless of variations in air received from the source of air supply. Such conditions exist, for example, in certain classes of testing machinery, such as are used in the manufacture of the commercial tin can. Such a machine is illustrated in my pending application for United States Letters Patent, Serial Number 272,889, filed April 26, 1928, for can tester.

An important object of the invention, therefore, is the provision of an air pressure reducer valve of simple construction and composed of parts which will not be easily broken and which can be adjusted to operate over a wide range of differences in air pressure.

Another object of the invention is the provision of a reducer valve which will automatically adjust itself, even though the air pressures received within the valve fluctuate rapidly and over a wide range of different pressures.

Numerous other objects and advantages of the invention will be apparent as it is better understood from the following description, which, taken in connection with the accompanying drawings, discloses a preferred embodiment thereof.

Referring to the drawings:

Figure 1 is a schematic view of an assembly of parts of one type of machinery using air at two different pressures, connected with the air pressure reducer valve of the present invention;

Fig. 2 is a top plan view of the reducer valve, with parts broken away to illustrate the interior construction;

Fig. 3 is a longitudinal sectional view taken along the air entrance and air delivery pipes, the view being taken substantially along the line 3—3 of Fig. 2, and Fig. 4 is a fragmentary sectional detail taken along the line 4—4 of Fig. 2.

As illustrated in Fig. 1, the air pressure reducer valve is adapted for use between a source of air supply and a machine using air at two different pressures. There is disclosed in Fig. 1 a portion of a machine, which, for the purpose of illustration, may be taken to be the can tester disclosed in my aforesaid pending application, using air at a pressure existing in the air line, such as is received in the reducer valve, and also using air at a reduced pressure such as is delivered by the reducer valve of the present invention.

An air line 10 receives air from any suitable source of supply (not shown) and delivers it to a storage tank 11, from which a pipe 12 connects with a part 13 of a machine 14, this part making use of the relatively high air pressure. A second part 15 of the machine 14 requires air at a reduced pressure and this is obtained in the following manner.

A pipe 16, communicating with the supply pipe 10, passes into the reducer valve 17 of the present invention, this pipe being connected at the air receiving end of the valve. An air delivery outlet pipe 18, constituting the air delivering line from the reducer valve 17, passes into a storage tank 19 from which the air at the reduced pressure is carried to the machine part 15 by means of a pipe 20.

The air pressure reducer valve comprises a casing 25, partially open at its top, the opening being surrounded by an annular seat 26 on which is positioned a flexible diaphragm 27 securely held at its edges within the annular seat 26 by means of a clamping ring 28. The central part of the diaphragm is free to move within certain limits and constitutes a flexible, movable and regulating device for the reducer valve. A cover member 29 is secured by bolts 30 to the casing 25 and is substantially a part thereof, the bolts passing through the clamping ring 28. A gasket member 31 may be interposed between the cover member 29 and the clamping ring 28, the three members 29, 28 and 25 constituting one complete air-tight assembly.

An air receiving or greater air pressure chamber 33 is thus formed within the casing 25 and beneath the flexible diaphragm 27, the air delivering pipe 16 being screwed into the wall of the casing 25 and communicating with the said chamber 33. A triangular partition member 34, formed integrally with the casing 25, encloses an air delivering or lesser air pressure chamber 35 which communicates with the air delivering pipe 18. As illustrated in Fig. 4, the casing 25 is formed with a passageway 36 communicating with a similar passageway 37 formed within the casing 25, the annular clamping ring 28 and the cover member 29 and connects with a horizontal passageway 38 leading into an auxiliary or regulating air chamber 39, formed between the cover member 29 and the upper surface of the flexible diaphragm 27.

A valve member is provided for regulating the passage of air from the chamber 33 into the chamber 35 and consists of a needle valve 40, formed with a shank 41 passing through washers 42 arranged on opposite sides of the central part of the flexible diaphragm 27. A lock nut 43 threadedly secured to the shank 41 forces the washers 42 against a shoulder 49 formed on the shank 41 and securely clamps the valve member to the flexible diaphragm in an air-tight joint.

The valve member cooperates with a suitable valve seat formed in the upper part of a threaded sleeve 44 secured within an opening 45 formed in the upper wall of the partition 34 and a valve port 46 passing through said sleeve forms a passageway between the chambers 33 and 35. The conical point 47 of the valve 40 extends within the port 46 of the sleeve 44 and engages the valve seat to form a closure for the port 46 when the valve member is in lowered position.

The valve member being mounted directly on the flexible diaphragm, the opening and closing of the port 46 is accomplished by the raising and lowering of the said valve member with the flexing of the diaphragm. By means of the described connecting ports 36, 37 and 38, the auxiliary chamber 39 contains air at the same pressure as the air contained within the chamber 35, and this forms one element in connection with the balancing of the flexible diaphragm 27. It is intended that the air within the chamber 35 be maintained at a reduced pressure relative to the air contained within the chamber 33, and therefore it is necessary, in order to hold the flexible diaphragm in its neutral position, to have the pressure of the air on the under surface of the diaphragm 27 in excess of the pressure of air on the upper surface of said diaphragm. Means are provided for augmenting the reduced pressure on the upper surface of the diaphragm in order to maintain the diaphragm in neutral position. This is accomplished through the medium of a pressure device which cooperates with the flexible diaphragm 27 and the valve member.

The pressure device is partially enclosed within a hub or extension 50 of the cover member 29 and said hub is internally threaded to receive a set screw 51 held in adjusted position by means of a lock nut 52. The lower end of the set screw 51 is provided with a reduced portion 53 about which is positioned one end of a coil spring 54 passing at its lower end over a button 55 resting upon the upper end of the shank 41 of the valve member. A second coil spring 56 is interposed between the upper surface of the sleeve 44 and the shoulder 49. Said spring 56 is relatively weaker than spring 54 and adds to the flexibility of the diaphragm 27. The force exerted by the spring 54 on the valve member plus the pressure of the air within the chamber 39 equals the force exerted by the spring 56 plus the pressure of the air within the chamber 33 when the diaphragm is in a balanced position. In its balanced position which is the position illustrated in Fig. 3, the valve member 47 is unseated from the sleeve 44 and communication is therefore formed between chamber 33 and chamber 35.

By means of the said pressure device the pressure difference between the air within chambers 33 and 35 is regulated. When this relative difference increases over the balanced condition, diaphragm 27 is raised and valve 40 is further unseated. When the relative difference decreases, diaphragm 27 is lowered and the communicating valve port 46 is closed. As the air under pressure is withdrawn through the delivery outlet pipe, more air passes through the valve port 46 to maintain the pressure difference. By increasing the compression of the spring 54 by means of the set screw 51, a greater difference in pressures between the air in the chambers 33 and 35 is obtained. A constant pressure difference is thus maintained for each fixed setting of the adjustable pressure device.

Provision is made for relieving the air automatically from the chamber 35 independently of withdrawal of the air through the delivery outlet pipes. A threaded plug 60 is provided with a bleed port 61 and is secured within the casing 25, the said port communicating directly with the chamber 35.

Air thus leaks slowly and constantly from the chamber 35 and thereby insures a slight opening of the valve member during most of the operation of the reducer valve. This practically constant flow of air through the port 46 keeps the same free from dust or other impurities. It also prevents prolonged non-operation of the valve member at times when air is not being withdrawn from the delivery outlet pipe 18 or when the pressure of the air received from the source of supply is suddenly reduced.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An air pressure reducer valve comprising, in combination, an air receiving chamber, an air delivering chamber, a valve member controlling the passage of air between said chambers, an auxiliary air chamber communicating with said air delivering chamber, a flexible diaphragm connected with said valve member and interposed between the air receiving chamber and the auxiliary chamber, and an adjustable pressure device cooperating with said flexible diaphragm whereby the valve member permits sufficient passage of air between the air receiving chamber and the air delivering chamber to maintain a pressure difference between said air receiving and air delivering chambers in accordance with the adjustment of said pressure device.

2. In a device for maintaining a constant difference between two related and cooperating air pressures, a valve casing having a higher pressure chamber and a lower pressure chamber, a valve arranged between said chambers, an inlet to the higher pressure chamber, an outlet from the lower pressure chamber, a movable part carrying said valve and exposed at one side to said higher pressure whereby the latter tends to open said valve and cause said inlet and outlet to communicate for the passage of the air, a constant air communication from said lower pressure chamber to the other side of said part, a mechanical pressure device acting on the latter side of the movable part and in conjunction with the lower pressure and with a pressure equal to the desired difference between said higher and lower pressures, and means for adjusting the force of the mechanical pressure device so that it will act with said difference of pressures.

3. In a device for maintaining a constant difference between two related and cooperating air pressures, a valve casing having a higher pressure chamber and a lower pressure chamber, a valve arranged between said chambers, an inlet to the higher pressure chamber, an outlet from the lower pressure chamber, a movable diaphragm carrying said valve and exposed at one side to said higher pressure whereby the latter tends to open said valve and cause said inlet and outlet to communicate for the passage of the air, a constant air communication from said lower pressure chamber to the other side of said diaphragm, a spring acting on the latter side of the diaphragm with a pressure equal to the desired difference between said higher and lower pressures, and means for adjusting the force of the spring so that it will act with said difference of pressures.

4. An air pressure reducer having in combination, a valve casing having therein a greater air pressure chamber, a lesser air pressure chamber and a regulating chamber, an air communication from the greater air pressure chamber to the lesser air pressure chamber, a valve controlling said communication, a diaphragm carrying said valve and cutting off said regulating chamber from said greater air pressure chamber, means whereby the diaphragm is oppositely acted on by said different air pressures, and means for applying and regulating more or less independent pressure to said diaphragm.

5. An air pressure reducer having in combination, a valve casing having therein a greater air pressure chamber, a lesser air pressure chamber and a regulating chamber, an air communication from the greater air pressure chamber to the lesser air pressure chamber, a valve controlling said communication, a diaphragm carrying said valve and cutting off said regulating chamber from said greater air pressure chamber, a spring adapted to press the diaphragm against the air in the greater air pressure chamber, an open communication between said regulating chamber and said lesser air pressure chamber, and means for regulating the pressure of said spring.

6. An air pressure reducer having in combination, a valve casing having therein a greater air pressure chamber, a lesser air pressure chamber and a regulating chamber, an air communication from the greater air pressure chamber to the lesser air pressure chamber, a valve controlling said communication, a movable device carrying said valve and cutting off said regulating chamber from said greater air pressure chamber, means whereby said movable device is oppositely acted on by said different air pressures, and means for applying and regulating more or less independent pressure to said movable device.

MAGNUS E. WIDELL.